US011975836B2

(12) United States Patent
De Graaff

(10) Patent No.: US 11,975,836 B2
(45) Date of Patent: May 7, 2024

(54) CLOSED WING VTOL AIRCRAFT

(71) Applicant: GKN Aerospace Services Limited, Solihull (GB)

(72) Inventor: Arent-Jan De Graaff, Papendrecht (NL)

(73) Assignee: GKN Aerospace Services Limited, Solihull (GB)

(*) Notice: Subject to any disclaimer, the term of this patent is extended or adjusted under 35 U.S.C. 154(b) by 87 days.

(21) Appl. No.: 17/626,513

(22) PCT Filed: Jul. 17, 2020

(86) PCT No.: PCT/GB2020/051716
§ 371 (c)(1),
(2) Date: Jan. 12, 2022

(87) PCT Pub. No.: WO2021/009516
PCT Pub. Date: Jan. 21, 2021

(65) Prior Publication Data
US 2022/0266995 A1     Aug. 25, 2022

(30) Foreign Application Priority Data
Jul. 18, 2019   (GB) ...................................... 1910278

(51) Int. Cl.
*B64C 39/06*     (2006.01)
*B64C 3/10*      (2006.01)
(Continued)

(52) U.S. Cl.
CPC .............. *B64C 39/068* (2013.01); *B64C 3/10* (2013.01); *B64C 27/26* (2013.01);
(Continued)

(58) Field of Classification Search
CPC .............................. B64C 39/068; B64C 39/08
See application file for complete search history.

(56) References Cited

U.S. PATENT DOCUMENTS

2020/0223542 A1* 7/2020 Moore ...................... B64C 3/38
2020/0354049 A1* 11/2020 Noppel ................... B64C 39/08
2021/0354816 A1* 11/2021 Oliveira ................ B64C 23/069

FOREIGN PATENT DOCUMENTS

CN        109018340 A     12/2018
CN        109987223 A      7/2019
(Continued)

OTHER PUBLICATIONS

International Search Report and Written Opinion dated Oct. 27, 2020 for PCT/GB2020/051716 (13 pages).

*Primary Examiner* — Nicholas McFall
(74) *Attorney, Agent, or Firm* — Bejin Bieneman PLC

(57) ABSTRACT

An aircraft, such as an unmanned aerial vehicle or single-seat aircraft, including a main body and a pair of wing sections, each wing section including a front wing and a rear wing, wherein the front wing and the rear wing each include a first end that is connected to the main body, and a second end, wherein the second end of the front wing is connected to the second end of the rear wing. The main body is located between the pair of wing sections, and each wing section includes a propulsion unit located between the front wing and the rear wing of the wing section. Each propulsion unit may include a first rotor and a second rotor, which may be pivotable with respect to the rest of the aircraft.

11 Claims, 2 Drawing Sheets

(51) Int. Cl.
    *B64C 27/26*     (2006.01)
    *B64C 29/00*     (2006.01)
    *B64C 39/02*     (2023.01)
    *B64U 30/20*     (2023.01)
(52) U.S. Cl.
    CPC ........ *B64C 29/0016* (2013.01); *B64C 39/024* (2013.01); *B64C 39/062* (2013.01); *B64U 30/20* (2023.01)

(56) References Cited

FOREIGN PATENT DOCUMENTS

| | | | |
|---|---|---|---|
| EP | 3119673 | A2 | 1/2017 |
| EP | 3412567 | A1 | 12/2018 |
| WO | 2011081683 | A1 | 7/2011 |
| WO | 2015019255 | A1 | 2/2015 |
| WO | 2019056052 | A1 | 3/2019 |
| WO | 2019202325 | A1 | 10/2019 |

\* cited by examiner

CLOSED WING VTOL AIRCRAFT

CROSS-REFERENCE TO RELATED APPLICATIONS

This application is a national stage of, and claims priority to, Patent Cooperation Treaty Application No. PCT/GB2020/051716, filed on Jul. 17, 2020, which application claims priority to Great Britain Application No. GB 1910278.9, filed on Jul. 18, 2019, which applications are hereby incorporated herein by reference in their entireties.

BACKGROUND

The present disclosure is concerned with an aircraft.

There currently exists a number of different types of aircraft employing a variety of different shapes and sizes.

SUMMARY

The present disclosure is about an aircraft type having a type of wing design that is nominally suited for use in smaller aircraft and also vertical take-off and landing (VTOL) aircraft.

In accordance with a first implementation, an aircraft includes: a main body; a pair of wing sections, each wing section having a front wing and a rear wing, wherein the front wing and the rear wing each include a first end that is connected to the main body, and a second end, wherein the second end of the front wing is connected to the second end of the rear wing; wherein the main body is located between the pair of wing sections, and each wing section includes a propulsion unit located between the front wing and the rear wing of the wing section.

The provision of the pair of wing sections whose front and rear wings each have a second end that are connected to each other, where the propulsion unit is located between these front and rear wings, provides an aerodynamic arrangement that is particularly suited for use in smaller aircraft and also VTOL aircraft.

It will be appreciated that a variety of different propulsion units may be used for propelling aircraft in use. However, in some implementations, each propulsion unit may include a first rotor and a second rotor, which may, in some particular implementations, be pivotable with respect to the front and rear wings as required and/or the rest of the aircraft.

The first rotor in some implementations may be connected to the front wing and/or connected to the main body.

The front wing may include a recess in which the first rotor is at least partially accommodated.

In accordance with some implementations, the first rotor may be located nearer the first end of the front wing than it is to the second end of the front wing.

The second rotor in some implementations may be connected to the rear wing.

The rear wing may include a recess in which the second rotor is at least partially accommodated.

In accordance with some implementations, the second rotor may be located nearer the first end of the rear wing than it is to the second end of the rear wing.

In some implementations, the rear wing may be located above the front wing in a height direction of the aircraft.

In accordance with some implementations, the second rotor may be located above the first rotor to help control and direct the thrust generated from the first and second rotors of each wing section.

In accordance with some implementations, for each wing portion, the rear wing may include a rear edge, wherein starting from the second end of the rear wing in a direction towards the first end of the rear wing, the rear edge of the rear wing extends in a direction away from the front wing.

The main body may include a canopy enclosing a cockpit of the aircraft, wherein at least one of the rotors is located beneath the canopy in a height direction of the aircraft. In such implementations, to reduce the chance of injury to an occupant of the aircraft when it is in use, it may be that each first rotor is located beneath the canopy in a height direction of the aircraft, and/or each second rotor may be located beneath the canopy in a height direction of the aircraft. In some implementations, each second rotor may be at least partially located behind the canopy in a length direction of the aircraft.

In accordance with the present disclosure, it is envisaged that any type of aircraft may be employed. In some implementations, however, the aircraft may be a single-seat aircraft; an unmanned aerial vehicle; and/or a VTOL (vertical take-off and landing) aircraft.

BRIEF DESCRIPTION OF THE DRAWINGS

Aspects of the present disclosure will now be described, by way of example only, with reference to the accompanying figures in which.

Figure 1:
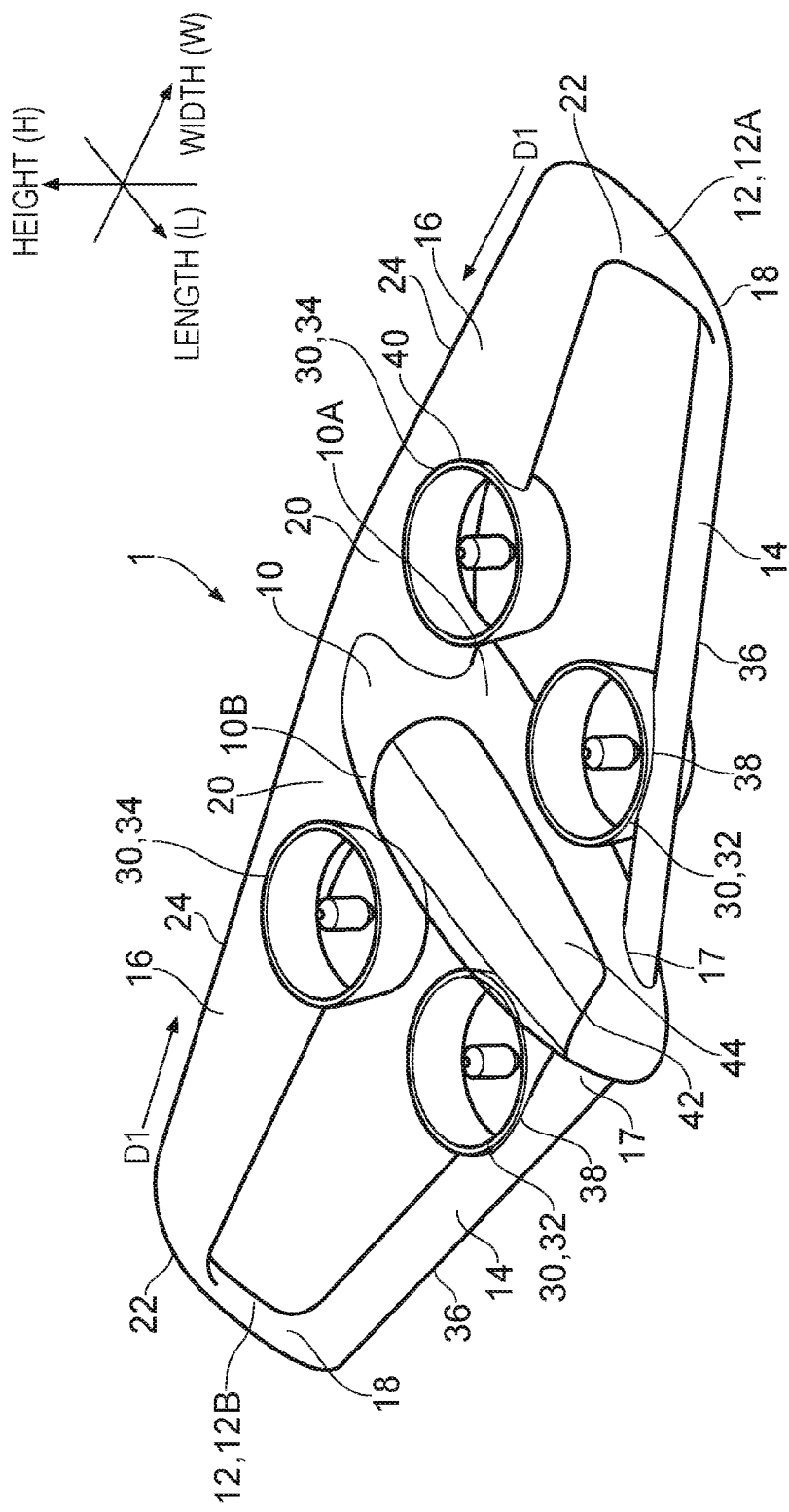
FIG. 1 shows a perspective view of a first implementation of an aircraft.

While implementations are susceptible to various modifications and alternative forms, specific implementations are shown by way of example in the drawings and are herein described in detail. It should be understood however that drawings and detailed description attached hereto are not intended to limit the present disclosure to the particular form disclosed, but rather the inventive concepts cover all modifications, equivalents, and alternatives falling within the scope of the appended claims.

It will be recognised that the features of the aspects of the present disclosure described herein can conveniently and interchangeably be used in any suitable combination. It will also be recognised that the present disclosure covers not only individual implementations, but also combinations of the implementations that have been discussed herein.

DETAILED DESCRIPTION

Aspects and features of certain examples and implementations are discussed/described herein. Some aspects and features of certain examples and implementations may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

With reference to the Figures, there is shown an aircraft 1 including a main body 10 and a pair of wing sections 12. In the aircraft shown in the Figures, the aircraft 1 extends about a length direction L, a width direction W, and a height direction H, which are all directions that are perpendicular to each other.

The main body 10 is located between the pair of wing sections 12, such that the pair of wing sections includes a first, left wing section 12A located on a first, left side 10A of the main body; and a second, right wing section 12B located on a second, right side 10B of the main body 10.

Each wing section 12 includes a front wing 14 and a rear wing 16. The front wing 14 includes a first end 17 that is connected to the main body 10, and a second end 18 which is opposite the first end of the front wing. Similarly, the rear wing 16 includes a first end 20 that is connected to the main body 10, and a second end 22 which is opposite the first end 20 of the rear wing 16.

The second end 18 of the front wing 14 of each wing section 12 is connected to the second end 22 of the rear wing 16 of the wing section. As such, each wing section forms a loop that is connected to the main body 10 in at least two locations, namely at the first end 17 of the front wing 14, and at the first end 20 of the rear wing 16. This arrangement generates a wing section 12 that has both good mechanical strength, and which also demonstrates reduced induced drag properties.

In the implementations shown in the Figures, the rear wing 16 of each wing section 12 may be located above (for the avoidance of any doubt, not necessarily directly above), the front wing 14 in a height direction H of the aircraft 10.

The rear wing 16 of each wing section 12 includes a rear/trailing edge 24. In accordance with some implementations, starting from the second end 22 of the rear wing 16 in a direction towards the first end 20 of the rear wing 16, the rear edge 24 may extend in a direction D1 away from the front wing 14. Put differently, each direction D1 may extend in a rearward direction towards a rear of the main body 10.

Each wing section 12 includes a propulsion unit 30, located between the front wing 14 and the rear wing 16 of the wing section, for generating thrust to propel the aircraft in use. In the aircraft 10 shown in the Figures, each propulsion unit 30 includes a first rotor 32 and a second rotor 34. In such implementations, the propulsion unit 30 of each wing section 12 may be located between a front/leading edge 36 of the front wing 14 and the rear edge 24 of the rear wing 16. Providing such a wing section 12 where the propulsion unit 30 is located between the front wing 14 and the rear wing 16 not only provides for a wing section 12 with good mechanical strength, but also allows the front wings 14 and rear wings 16 to act as a physical barrier for better preventing inadvertent access by ground crew to the propulsion unit 30 when the aircraft 1 is on the ground and when the propulsion unit 30 is operational.

In accordance with some implementations, the first rotor 32 may be connected to the front wing 14, and/or the main body 10. In some implementations, such as those shown in the implementation of aircraft from FIGS. 1 and 2, the front wing 14 of each wing section 12 may include a recess 38 in which the first rotor 32 is at least partially accommodated. In accordance with some implementations, the first rotor 32 may be pivotable with respect to the front wing 14 and/or the recess 32 as required to allow better control of thrust generated from the rotor with respect to the aircraft 1.

With respect to the second rotor 34 of each wing section 12, in some implementations the second rotor 34 may be connected to the rear wing 16 and/or the main body 10. In some implementations, the rear wing 16 may include a recess 40 in which the second rotor 34 is at least partially accommodated. Again, in some implementations, the second rotor 34 may be pivotable with respect to the rear wing 14 and/or the recess 40 for better controlling the thrust generated from the rotor with respect to the aircraft 1.

By allowing each propulsion unit 30, and/or the first rotor 32 and second rotor 34, to pivot with respect to the rest of the aircraft 1, this serves to better allow the aircraft 1 to be used as a VTOL (vertical take-off and landing) aircraft.

Figure 2:
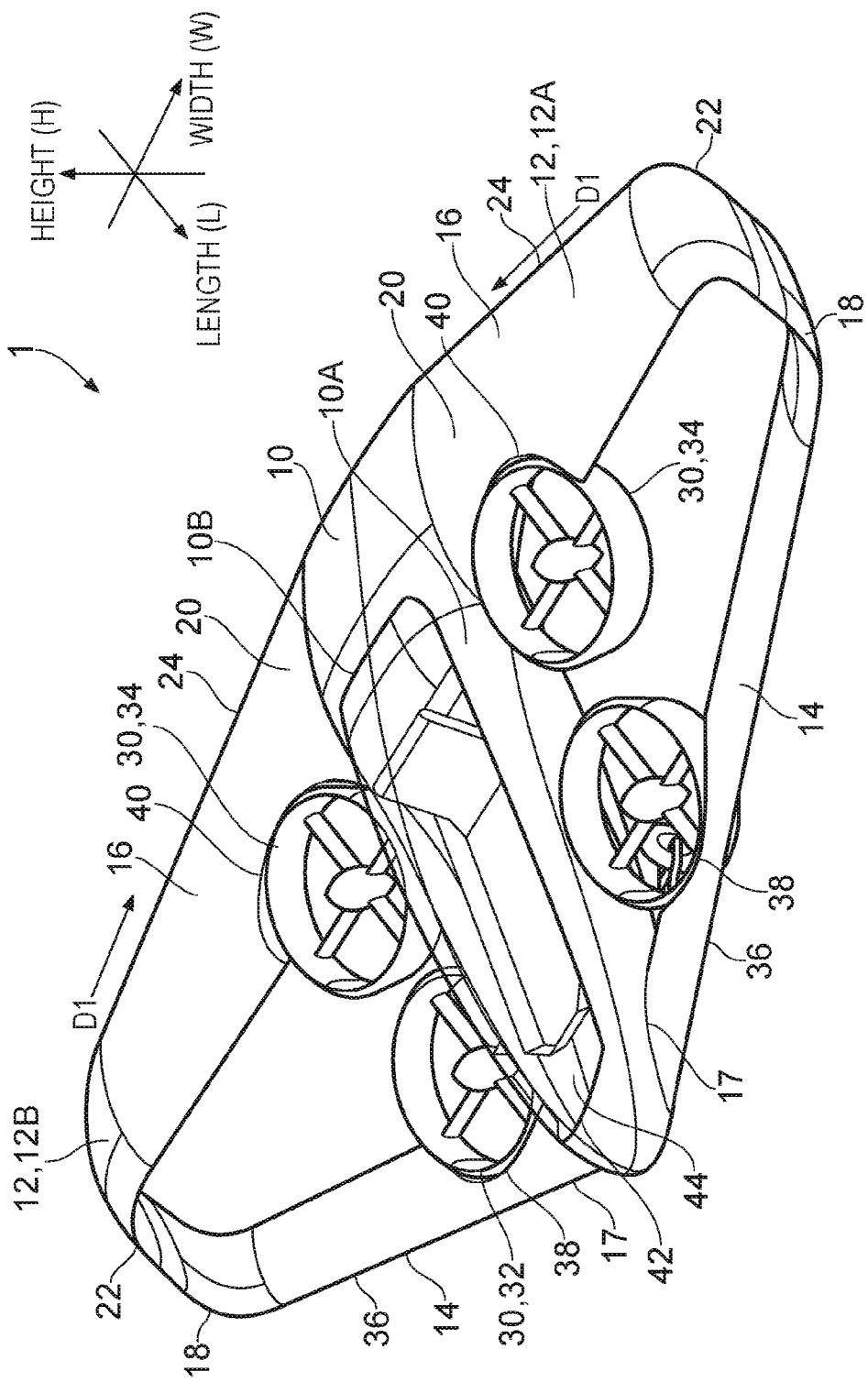
FIG. 2 shows a perspective view of a second implementation of an aircraft.

In some implementations, such as those shown in FIGS. 1 and 2, to help control and direct the thrust generated from the first rotor 32 and second rotor 34 of each wing section, the first rotor 32 may be located nearer the first end 17 of the front wing 14 than it is to the second end 18 of the front wing 14, and/or with the second rotor 34 located nearer the first end 20 of the rear wing than it is to the second end 22 of the rear wing 16.

In additional implementations, to help control and direct the thrust generated from the first rotor 32 and second rotor 34, the second rotor 34 may be located above the first rotor 32 in the height direction H of the aircraft 1. In the implementations of aircraft 1 shown in FIGS. 1 and 2, the second rotor 34 is located above the first rotor 32 in the height direction H of the aircraft 1, yet behind the first rotor 32 in a length direction L of the aircraft 1.

In implementations where the aircraft is a manned aircraft, the main body 10 of the aircraft 1 may include a canopy 42 enclosing a cockpit 44 of the aircraft 1. The cockpit 44 in some implementations may be configured such that the aircraft may be provided as a single-seat aircraft, as is shown in the implementation aircraft 1 from FIGS. 1 and 2.

In implementations where the canopy 42 is present, to reduce the chance of injury to an occupant of the aircraft from each propulsion unit 30, the propulsion unit 30; first rotor 32; and/or second rotor 34 of each wing section 12 may in some implementations be located beneath the canopy 42 in a height direction H of the aircraft 1. In some implementations, the second rotor 34 may be at least partially located behind the canopy 42 in a length direction L of the aircraft 1.

In terms of the powering and control of the aircraft 1, it will be appreciated that the necessary electronics, power source, mechanical, and electrical controls and connections may be distributed throughout the aircraft 1, as required. In cases where the aircraft is an unmanned aerial vehicle, the aircraft 1 would also then, as required, include the necessary communication means for it to be operated by a user from a location remote from the aircraft.

In the embodiments shown in FIGS. 1 and 2, it can be seen that the aircraft 1 does not include a tail fin.

Thus, an aircraft may include: a main body; a pair of wing sections, each wing section including a front wing and a rear wing, wherein the front wing and the rear wing each include a first end that is connected to the main body, and a second end, wherein the second end of the front wing is connected to the second end of the rear wing; wherein the main body is located between the pair of wing sections, and each wing section includes a propulsion unit located between the front wing and the rear wing of the wing section. The provision of the pair of wing sections whose front and rear wings each have a second end that are connected to each other, where the propulsion unit is located between these front and rear wings provides an aerodynamic arrangement that, although not exclusively, is particularly suited for use in smaller aircraft and also VTOL (vertical take-off and landing) aircraft.

In order to address various issues and advance the art, this disclosure shows by way of illustration various implementations of aircraft. The advantages and features of the disclosure are of a representative sample of implementations only, and are not exhaustive and/or exclusive. They are presented only to assist in understanding and to teach the claimed invention(s). It is to be understood that advantages, implementations, examples, functions, features, structures, and/or other aspects of the disclosure are not to be considered limitations on the disclosure as defined by the claims or limitations on equivalents to the claims, and that other implementations may be utilised and modifications may be made without departing from the scope of the claims. Various implementations may suitably comprise, consist of, or consist essentially of, various combinations of the disclosed elements, components, features, parts, steps, means, etc. other than those specifically described herein, and it will thus be appreciated that features of the dependent claims may be combined with features of the independent claims in combinations other than those explicitly set out in the claims. The disclosure may include other inventions not presently claimed, but which may be claimed in future.

It will be appreciated that while the above description has focused on some specific aircraft configurations including a number of different features, aircraft in accordance with other implementations of the disclosure may not include all these features. For example, the aircraft shown in the Figures are shown as including a cockpit for a pilot that is enclosed by a canopy. However, in some implementations the aircraft may be operated without such a canopy/cockpit, and instead take the form of an unmanned aerial vehicle, which may for instance then have communication means for being operated by a user from a location remote from the aircraft.

The invention claimed is:

1. An aircraft, comprising:
   a main body;
   a pair of wing sections, each wing section including a front wing and a rear wing, wherein the front wing and the rear wing each include a first end that is connected to the main body, and a second end distal to the main body; and
   a propulsion unit located between the front wing and the rear wing of each wing section,
   wherein the second end of each front wing of a respective wing section is connected to the second end of each rear wing of the respective wing section,
   wherein the main body is located between the pair of wing sections,
   wherein each propulsion unit comprises a first rotor and a second rotor,
   wherein the first rotor is connected to at least one of the front wing and the main body,
   wherein a rear edge of the front wing comprises a recess in which the first rotor is at least partially accommodated,
   wherein the second rotor is connected to the rear wing, wherein a front, leading edge of the rear wing comprises a recess in which the second rotor is at least partially accommodated; and
   wherein the main body comprises a canopy enclosing a cockpit of the aircraft, wherein each second rotor is located beneath the canopy in a height direction of the aircraft.

2. The aircraft of claim 1, wherein the first rotor is located nearer the first end of the front wing than it is to the second end of the front wing.

3. The aircraft of claim 1, wherein the second rotor is located nearer the first end of the rear wing than it is to the second end of the rear wing.

4. The aircraft of claim 1, wherein the rear wing is located above the front wing in a height direction of the aircraft.

5. The aircraft of claim 1, wherein the second rotor is located above the first rotor.

6. The aircraft of claim 1, wherein the rear wing includes a rear edge, wherein starting from the second end of the rear wing in a direction towards the first end of the rear wing, the rear edge of the rear wing extends in a direction away from the front wing.

7. The aircraft of claim 1, wherein each first rotor is located beneath the canopy in a height direction of the aircraft.

8. The aircraft of claim 1, wherein the aircraft is a single-seat aircraft.

9. The aircraft of claim 1, wherein the aircraft is a vertical take-off and landing (VTOL) aircraft.

10. The aircraft of claim 1, wherein the aircraft does not comprise a tail fin.

11. The aircraft of claim 1, wherein each wing of each wing section comprises a single rotor.

* * * * *